United States Patent
Artbauer

[11] 3,852,511
[45] Dec. 3, 1974

[54] GAS INSULATED HIGH VOLTAGE CABLE

[75] Inventor: Jan Artbauer, Langenhagen, Germany

[73] Assignee: Kabel-und Metallwerke Gutehoffnungshutte Aktiengesellschaft, Hannover, Germany

[22] Filed: July 5, 1973

[21] Appl. No.: 376,521

[30] Foreign Application Priority Data
July 6, 1972  Germany.............................. 2233217

[52] U.S. Cl................ 174/11 R, 174/22 C, 174/28
[51] Int. Cl...................... H01b 9/06, H02g 15/24
[58] Field of Search........ 174/10, 11 R, 16 B, 21 R, 174/21 C, 22 R, 22 C, 23 R, 28, 102 D, 106 D

[56] References Cited
UNITED STATES PATENTS

| | | | |
|---|---|---|---|
| 2,296,766 | 9/1942 | Bruno | 174/22 C |
| 3,331,911 | 7/1967 | Whitehead | 174/22 R |
| 3,348,001 | 10/1967 | Upton, Jr. et al. | 174/28 UX |
| 3,558,798 | 1/1971 | Albright | 174/22 R X |
| 3,573,342 | 4/1971 | Graybill et al. | 174/28 X |

FOREIGN PATENTS OR APPLICATIONS

| | | | |
|---|---|---|---|
| 647,627 | 12/1950 | Great Britain | 174/22 C |
| 1,133,270 | 11/1968 | Great Britain | 174/28 |
| 15,457 | 7/1969 | Japan | 174/22 C |

Primary Examiner—Laramie E. Askin
Attorney, Agent, or Firm—Ralf H. Siegemund

[57] ABSTRACT

A gas insulated cable is constructed from an inner solid, tubular or multistrand conductor and an outer conductor constructed as tubular, seam-welded corrugated strip. The interior space is sealed off through cable end washers but the interior is accessible through valves. Special blind bore elements permit sealing of the ends of multistrand conductors for passage through the end washers. Three way valves are used to interconnect otherwise separated and hermetically sealed cable sections to be interconnected upon installation. The cable is filled with insulative gas and sealed prior to transport to the installation site.

6 Claims, 5 Drawing Figures

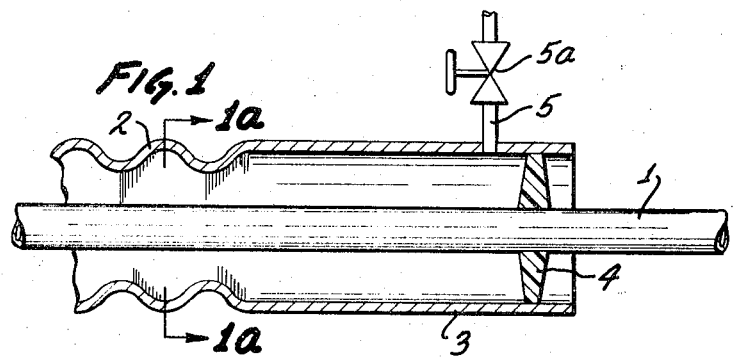
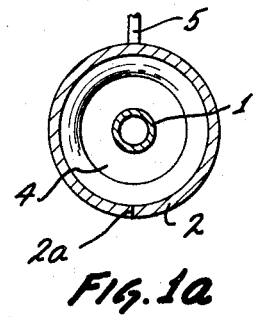
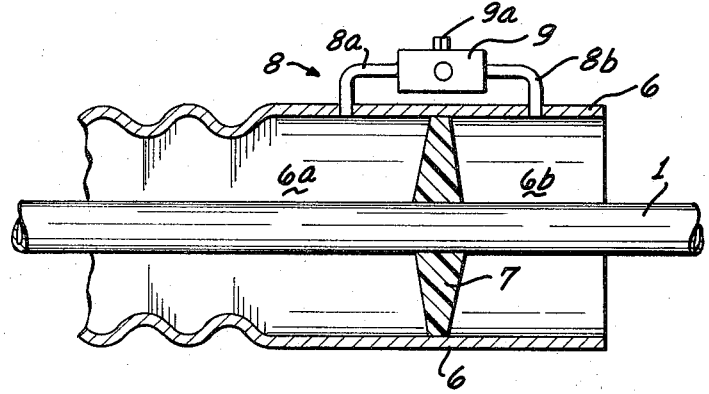
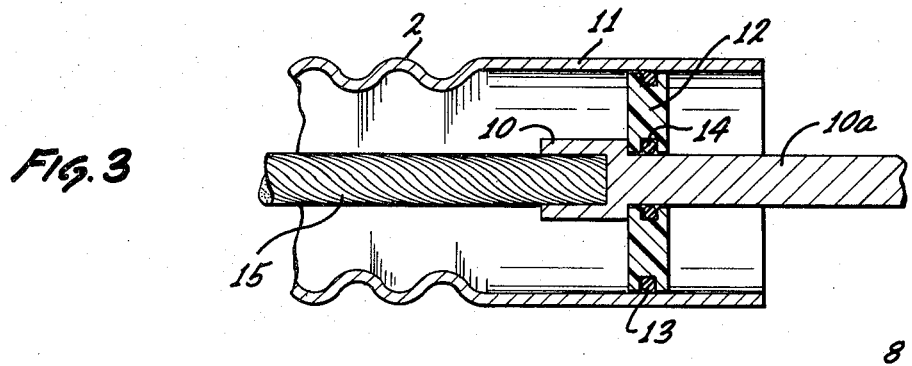
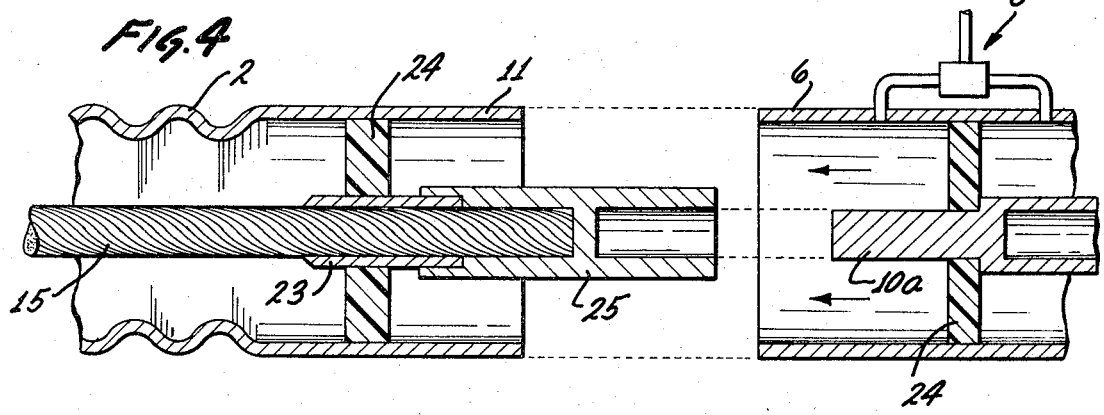

GAS INSULATED HIGH VOLTAGE CABLE

BACKGROUND OF THE INVENTION

The present invention relates to improvements in gas insulated, high voltage cable constructed for reeling on a drum for and during transport. The cable is presumed to be constructed in concentric configuration, having an inner, high voltage conductor and an outer envelope which is usually a grounded conductor and serves as electrical return path; the outer and inner conductors are insulated from each other, due to concentric spacing whereby the gas provides for insulation enhancement.

High voltage transmission lines, with gas insulation are usually manufactured in a plant and in sections, and these sections are then hauled to the installation site and installed thereat. The sections have been tested in the plant, but do not yet contain any gas filling (other than air). Upon installing the sections, adjoining sections have their respective inner and outer conductors interconnected to obtain electrical, low resistance through connection. After the entire transmission line has been installed, the ends are sealed, the line is evacuated and finally filled with insulation enhancing gas such as $SF_6$.

Occasionally, it is desirable to compartmentize the cable and to pressurize the sections individually. Under such circumstances, separating and connecting pieces are interposed between adjacent cable sections. These connector elements provide for connection between inner conductors and outer conductors of the respective two cable sections to be interconnected, and they close off individually the interior space of each section.

These known high voltage transmission lines suffer from the drawback that the gaseous insulation for the cable is provided at the installation site. This means that the gaseous insulation is established under conditions readily permitting inclusion of metal particles, dust, etc., even moisture may readily enter the insulation space which will deteriorate the insulation drastically. These and other, sometimes unforeseeable and unavoidable disturbances tend to reduce the effect of the gaseous insulation, and the maximum voltage that may be transmitted via such a transmission line is lowered accordingly.

The German printed Patent Application DOS 1934 812 proposes utilization of rather short sections (about 40' long) using rigid pipes as inner and outer conductor which are tested, filled with insulative gas and sealed. Long links will require many sections with multiple connecting joints. Each joint is, so to speak, a weak link in the line. Moreover, the transport of these sections is difficult and installation cost is rather high.

SUMMARY OF THE INVENTION

It is an object of the present invention to provide a high voltage cable which can be made substantially without restriction as to length and which can be filled with gas prior to transportation to the installation site. The cable should be completed to the extent that merely unreeling from a drum and the usual on site work is required as is conventional for other types of cable.

In accordance with the present invention, it is suggested to construct such a high voltage cable by using an inner conductor core (solid, tubular, or multiple stranded conductor) about which is bent a metal strip in concentric, spaced-apart relation. The strip is seam-welded along the two adjoining edges to seal the resulting tube, and the tubularly bent strip is then corrugated. Such a cable can be made of indefinite length on a continuous basis. A length of such a cable is cut for any reason. For example, a cable is needed only in a particular length and such a length is cut from an endless product as made. However, there are some restrictions on transport drums and how much cable can be wound on such a drum. E.g., for a cable with an outer diameter of 9 inches, about 600' or a little more is a reasonable limitation. That, however, is a limitation which has nothing to do with the invention. The ends of a length of such a cable are provided with annular insulating washers, gas tightly sealed against the tubular outer conductor or to a smooth wall extension sleeve thereof. The inner conductor or an extension thereof sealingly traverses the washer. The cable is provided with a gas inlet/outlet on the side of one of the washers facing the interior of the cable. The decisive aspect, therefor, is that the entire length of a cable under consideration is sealed at its ends and filled with pressurized insulation enhancing gas prior to transport to the installation site. The gas filling remains unaffected by the subsequent installation.

In accordance with the preferred embodiment of the invention, the ends of the tubular cable envelope are connected to sleeves with smooth surface and these sleeves receive the washers. At least one of the two sleeves has an, or the fluid inlet/outlet for the cable, whereby preferably a valve controlled bypass is provided between the two chambers in the sleeve as respectively defined to both sides of the washer therein.

The inner conductor may be provided from many stranded wire filaments. Such a conductor establishes a leakage path for gas. Therefore, the sealing washers are not immediately penetrated by that inner conductor; rather a blind bore-like tube or sleeve or an assembly of such elements is sealingly received by the washer, and the strands all end in the blind bore and are secured thereto in a way granting a good electrical connection, e.g. by welding, soldering or pressing. This way, the cable interior is sealed by the washer and by the blind bore sleeve as inserted in the washer. This particular feature dispenses with the requirement of sealing the stranded conductor core itself.

Therefor, it can be seen that a complete cable to be installed, and assuming the length thereof does not exceed reeling capacity of a drum or other hauling equipment, is comprised of one integral piece of cable with corrugated outer conductor and smooth wall sleeve ends. The interior of the cable is sealed by two washers traversed by the inner conductor, either directly, if this conductor is solid or tubular, or via extensions, if the conductors are stranded filaments, whereby the extensions seal the interior of the inner conductor. The inner conductor or its extensions are then electrically connected to the respective voltage source and destination, while the outer conductor is grounded. Should the total cable length exceed available reeling capacity, respective two reelable lengths are interconnected in mutually sealed relation, whereby a chamber is established by the two adjacent sleeve ends and here particularly between the two washers of the adjoining cable ends. That chamber may be filled with insulative gas from one or both main cable portions, on site, whereby subsequently the two cables may be gas conductively interconnected through that chamber. The above mentioned valve control bypass may serve here as gas conduit. The valving, however, permits initial or emergency shut-off of any cable section so installed.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 is a cross section through an end portion of a high voltage cable improved in accordance with a first example of the preferred embodiment of the invention;

FIG. 1a is a cross section along line 1a—1a of FIG. 1; and

FIGS. 2, 3 and 4 are cross sections similar to FIG. 1, but taken through high voltage cable ends improved in accordance with different examples of the preferred embodiment of the invention.

Proceeding now to the detailed description of the drawings, FIG. 1 shows a conductor 1 comprised, for example, of a corrugated tube as voltage conductor. This inner conductor 1 is enveloped by a tubular, outer conductor 2 which is corrugated and serves as ground conductor. The interior ring space between conductors 1 and 2 is pressurized by means of a gas which enhances electrical insulation between the conductors. Preferably $SF_6$ is used as insulative material.

The conductors are maintained in concentric position to each other by means of conventional insulative spacers. The outer conductor (and, possibly, also the inner conductor) has been made from longitudinally paid strip 2, which has been bent and folded about an axis so that the longitudinal edges adjoin or overlap to form a tube. The folding process has been carried out about inner conductor 1 with spacers already seated thereon. The edges of strip 2 have been seam-welded (weld 2a) and the resulting tube has been corrugated subsequently; the corrugation may be helical or annular. Such a cable can be made in any length and in a continuous process. The needed length is cut from such an endless cable.

Assuming now that a particular cable length or section is available, the one end of conductor tube 2 is connected to a cylindrical sleeve 3, for example, by means of welding or soldering this sleeve to the tubular strip 2, so as to provide a gas tightly sealed joint between tube 2 and sleeve 3. The annular ring space in sleeve 3, as traversed by inner conductor 1, is sealed by an annular, insulative washer 4, which is sealingly seated on the conductor 1. The periphery of washer 4 sealingly engages the inner wall of sleeve 3. The engagement in either case must be sufficiently strong to take up any pressure differential on opposite sides of the washer. Washer 4 is made of plastic e.g. by casting or by injection molding.

The sleeve 3 is provided with a laterally extending filling tube 5 terminating or/and communicating with that side of washer 4 that faces tube 2. Fluid passage through filling tube 5 is governed by a valve 5a mounted permanently therewith on sleeve 3. The interior of this concentric cable arrangement is filled with gas, e.g., $SF_6$, through valve 5. This filling facility as including sleeve 3 with washer 4 and valve 5 is part of the permanent installation of the cable. The other end of the cable may be provided with a similar sleeve plus washer and seal. It does not, however, have to have a filling inlet 5.

It can, thus, be seen that the interior of the cable can be hermetically sealed without impairing transportability. If the inner conductor 1 is a tube, care must be taken that the interior of that tube does not communicate with the interior of the cable as a whole or that the tube is sealed on both ends. The construction as explained, therefore, permits filling, sealing and testing of a length of the cable before installation. The cable can then be reeled on a drum and hauled to the installation site. The insulative properties of the cable are thus known and determined before installation, and any corrective steps that may prove necessary, can be taken before transport to the installation site. A length of gas insulated line is usually tested by means of a test filling, but it was previously necessary to vent the line for transportation and to refill it at the site. This is no longer necessary, if the cable is constructed as described. Cost generally and expenses and effort of installation in particular, are reduced.

This particular end sleeve 3 (on both ends, or on one end with elimination of the filling facility for the other end) will be used when the length of cable so provided and transported, suffices. It should be noted, however, that the washers could be placed close to the (right-hand) end of two respective sleeve so that these two sleeves of two cable ends when interconnected do not leave any air filled space, but the washers abut the respective inner and outer conductors can be directly interconnected. However, a somewhat different construction is preferred for extensive cable lengths.

FIG. 2 shows a similar cable with inner conductor 1 and an outer conductor tube made from tubular bent strip 2 as described above. A cable end sleeve 6 is also secured to tube 2 as before. A washer 7 is mounted inside of sleeve 6 just as washer 4 is mounted in sleeve 3 and performs the same function. However, in deviation from FIG. 1, there is a bypass 8 interconnecting the two cylindrical chambers 6a and 6b in sleeve 6 as defined to both sides of and as separated by washer 7. The bypass 8 is under control of a three way valve 9, having a fluid inlet 9a that may lead to the gas supply.

The installation of the bypass with valve as a permanent fixture permits employment of the arrangement in any of the following modes. The inlet/outlet 9a can be connected to a suction pump, and valve 9 connects the left-hand chamber 6a of sleeve 6 via inlet/outlet duct 8a to that suction pump. Chamber 6a is, of course, in direct communication with the interior of the cable tube 2. Now, the cable interior can be evacuated. Subsequently, valve 9 disconnects inlet/outlet 9a from chamber 6a and the inlet/outlet is connected to a source of gas. Upon changing the valve position again, cable tube 2 is filled with pressurized gas. Upon completion of filling, the valve 9 is adjusted to disconnect chamber 6a from the inlet 9a, and the gas pressure source is removed for the transport. The normal valve state subsequent to installation may connect inlet 9a to chamber 6b, but that is not necessary and may be undesirable in cases. It is important, however, that the interior of cable tube 2 remains sealed during the subsequent transport and installation. After installation, valve 9 may again connect inlet 9a to branch 8a, if a pressure sustaining source is permanently connected to inlet 9a; that, of course, may hold true also for the valve 5a in FIG. 1 and inlet tube 5.

The principal purpose of the bypass 8, however, is to have chambers 6a and 6b normally interconnected under the following circumstances. In order to transport a length of such cable already filled with gas, it is, of course, necessary to seal the interior of the outer cable tube 2. In some cases it may be necessary to connect the length of cable to another length of cable, because the hauling capacity of the available drum has been exceeded. Both cable lengths are hauled to the installation, both of them are already filled with insulation gas and sealed. The two inner conductors are then interconnected, so are the outer conductors, or more accurately, the respective two sleeves 6 are connected together. There will be established now a chamber as between the two washers. More particularly, the two adjoining and now interconnected chambers 6b are sealed upon welding or otherwise connecting the respective outer tube extensions, i.e. the two sleeves 6, together. By using a sleeve with a three way valve as described, at least one of the cable ends of these two adjoining chambers 6b can be evacuated on site and filled with gas. Since the combined chambers 6b—6b are quite small in comparison with the volume of the cables themselves, one merely needs to bleed off a minute portion of the main cable filling to fill these communicating chambers 6b. The normal state for at least one of the two three way valves (if two are provided) may be to permanently bypass the washer so that insulation enhancement is also provided for that short cable section. However, after an initial filling as described, each length of cable may be gas conductively separated from the others as well as from the interconnected chambers 6b.

One can, however, readily see the following possibilities. If both adjoining and now interconnected cable end sleeves 6 are provided with a bypass 8, the two cable interiors can be interconnected in that the one bypass valve connects its cable tube interior to its chamber portion 6b, and the other bypass valve does the same. Under such circumstances the entire cable interior can be gas conductively interconnected once installed. One cable end may then be connected to a gas pressure sustaining source.

These valves permit, however, immediate separation of one cable length from the others, for example, if a leak is detected in one of them. For reasons of that possibility it may not be desirable to have the several cable interiors permanently interconnected, so that one or the other or both of the three way valves are turned off for complete sealing. If even an initial pressure equalization throughout the entire cable is not deemed necessary, only one of the cable ends to be interconnected needs to have a three way valve construction as described with reference to FIG. 2. The other cable end may have only an end construction as shown in FIG. 1, and even a simple sleeve plus washer may suffice if that other cable length was filled from the other end.

In the examples above, it was assumed that conductor 1 is solid or a tube. In particular then, it was presumed that the interior of the inner conductor was not in any way in communication with the interior of the cable as defined by the annular space between conductors 1 and 2. It may be preferred, however, in certain cases to use an inner conductor 1 which is comprised of plural stranded conductor filaments. Such a cable, though solid in appearance, has actually a large multitude of voids, and gas can readily leak into these voids and migrate longitudinally in the conductor. Without further measures, gas would readily leak through the conductor as the conductor traverses washers such as 4 or 7.

One could seal the conductor itself by filling a length thereof with solder. However, sealing the stranded conductor in that manner was found unsuitable. The liquid solder will not penetrate deeply enough into the cable but will solidify too early because the strands offer a large area for heat transfer. Thus, a large amount of solder is needed, but it was found that completely sealing these voids in a multistrand conductor is quite unreliable.

Turning now to FIG. 3, outer conductor strip 2 is of tubular, seam-welded and corrugated construction as before. There is an end sleeve 11, but the sleeve is not shown with any valve constructions, as it is assumed that such a valve is provided at the other end of the cable. Having at least one filling facility is essential for practicing the invention. In accordance with the particular features of FIG. 3, the end of a stranded conductor 15 is received in a small sleeve 10 in press fit, or the conductor strands are soldered or welded to that sleeve. Element 10 is actually a short rod with a blind bore, serving as a conductor extension as outlined in the introduction. 10a denotes a rod-like further extension.

A sealing washer 12 of electrically insulative material is traversed by pin or rod 10a, which connects to or is integral with sleeve 10. The pin with sleeve 10 can be regarded as a conductor extension which leads out of the gas filled cable chamber. The washer 12, of course, must have the same insulative strength as the other washers. The sleeve 10 with its blind bore serves, so to speak, as a positive stop for any gas that migrates through the voids of the stranded conductor filaments 15.

FIG. 3 is still used to explain another variation. The gas seal could be established additionally, e.g. through rubber rings such as 13 and 14, held in annular grooves in washer 12 and projecting therefrom slightly to sealingly engage the smooth abutting surfaces of elements 10a and 11. This may be desirable if washer 12 is rather rigid. Such sealing is reliable even under mechanical wear and elevated temperatures.

If several lengths of cables are interconnected, each being, so to speak, hermetically terminated as shown in FIG. 3, pins 10a of adjoining length are interconnected just as solid conductors are conventionally interconnected. The outer sleeve ends are interconnected as before. Of course, one end sleeve should have a bypass valve construction (see the, e.g., right-hand portion of FIG. 4).

In lieu of the sealing as between pin and washer as shown generally in FIG. 3, or between a solid or tubular inner conductor and the washer as shown in FIGS. 1 and 2, one can use a special sleeve 23 interposed between a washer 24 and the conductor core or a pin. In the particular configuration shown in FIG. 4, a metal sleeve 23 may be bonded to washer 24. For example, upon casting washer 24 from a suitable artificial resin, sleeve 23 may be inserted during the casting process so that a firm bond is established between this small sleeve and the washer upon solidification of the latter. Washer 24 sealingly engages sleeve 11, but an O-ring could be used as described with reference to FIG. 3.

The sleeve 23 has one end received by one end of a receiver and connector sleeve 25 having a central divider wall to establish two blind bores. The cable strands 15 traverse sleeve 23 and also the one bore of connector element 25. Sleeve 23 is, e.g., soldered or welded to element 25 so that, in fact, the interior of sleeve 23 as well as the one blind bore are sealed from the exterior and constitute a sealed enclosure for the strands of core 1. In this construction, one can term the combined elements 23–25 a conductor extension, leading out of the gaseous interior of the cable but without permitting gas leakage through the voids of stranded conductors 15.

In lieu of directly bonding sleeve 23 to member 25, the latter may be just seated on the former, and rubber, or rings, located in suitable grooves, may seal sleeve 23 relative to connector 25. The latter mode of sealing may be required so that elements 23 and 25 are permitted to slide relative to each other without establishing a gas leakage path. Providing for such limited displacement may be necessary for taking up and length compensation due to thermal expansion.

The conductor core 1 may be soldered or welded or otherwise secured to sleeve 23, so that in effect conductor 1 is secured to washer 24. Interconnecting these parts axially in such a fashion may be necessary if any relative movement between conductors 1 and 2 is to be avoided. Such motion could occur if strong pressure forces tend to move washer 24 inside of sleeve 11, or if for some reason, thermal expansion of the conductor is impeded. Under such circumstances length compensation is taken up by the corrugations of tube 2.

One can readily see that the configuration of FIG. 3 will be used at the true end of the cable, with pin 10a connected to the source or destination for the high voltage. However, an arrangement of FIG. 4 will be used on one cable end together with a cable section end as shown in FIG. 3, with one end sleeve being constructed to have a bypass as shown on the right-hand side of FIG. 4. The particular pin 10a is then stuck in the other blind bore of member 25 to establish mechanical and electrical connection therewith. Press fit may suffice, but additional bonding, e.g. soldering may be more satisfactory. The outer sleeves are soldered or welded together as before. The resulting small chamber as between the washers is then filled through the three way valve. Of course, the sleeve 11 in FIG. 4 could be provided with inlets of the type shown in FIG 1; all these features must be understood as being interchangeable.

The several sleeves 3, 6a and 11 are shown for simple axial end to end connection. They could be provided, however, with flanges to be bolted to each other. This holds true for the free end of either sleeve as illustrated as well as for the connection of an end sleeve to the corrugated tube 2 proper. However, flanging the sleeve ends enlarges the area of contact which is beneficial for obtaining an electrically low-resistance interconnection. The flanges could also be welded or soldered as described.

It is possible in principle to have the sleeves, such as 3, 6 or 11 provided as integral parts of the tube, i.e., they could be end portions of tube 2, which are not corrugated. However, there are two reasons not to proceed in that manner. First, it is impractical to install these inlets 5 and 8 etc. on such a tube. It is more practical to manufacture such sleeves plus valving separately, and to weld such sleeves to the tube ends. This, of course, is relevant only to sleeves with tubing. The second reason, however, involves sleeves with as well as without valves. The welding seam makes sealing somewhat difficult unless the inner surface of the sleeve is fine finished and has a smooth surface at least where sealingly engaging the washer. Such finishing, if not avoidable, should be carried out on a separate element rather than on an integral end of tube 2.

The invention is not limited to the embodiments described above but all changes and modifications thereof not constituting departures from the spirit and scope of the invention are intended to be included.

I claim:

1. In a long, gas insulated high voltage cable comprising:

relatively long, reelable, individually sealed and self-contained sections, each section being filled with insulative gas and being at least as long so as to permit winding in several turns on a drum;

each section having (a) an inner conductor, (b) an outer conductor constructed as a metal strip with edges and bent around the inner conductor in concentric relation thereto to establish a tubular configuration and having a welding seam along the strip edges for sealing the space between the tubularly bent strip and the inner conductor, the bent strip with welding seam being corrugated and constituting a corrugated tube, each section further having (c) a first and a second sleeve respectively secured in gas tight and sealed relation to or integral with opposite ends of the bent, welded and corrugated strip as constituting said tube, (d) a first and a second washer respectively in said sleeves, the washers being made of insulating material and being respectively sealingly traversed by the inner conductor or by a closed-surface extension thereof, thereby sealing the interior of the section to which they pertain; and (e) means on at least one of the sleeves of each section for providing a fluid inlet and outlet on the side of the respective washer facing the interior of said tube;

said gas filled sections being interconnected by means of one each of their respective sleeves as adjoining the sections having been prefilled prior to interconnection of two sections through their respective adjoining sleeves.

2. Cable as in claim 1, wherein the first and second sleeves are un-corrugated.

3. Cable as in claim 1, wherein the one sleeve has a second fluid inlet and outlet on the other side of the said washer, and valve means for interconnecting the first and second inlet/outlet and for connecting either of them to a fluid passage external to the sleeve through which fluid may flow to or from the sleeve.

4. Cable as in claim 1, wherein the one sleeve has a second fluid inlet and outlet on the other side of the washer, and valve means for interconnecting the first and second inlet/outlet.

5. Cable as in claim 1, wherein at least one conductor extension is connected to one end of the inner conductor the extension being constructed as a sleeve, the latter sleeve sealingly traversing the respective washer, the extension further including a connecting member with a blind bore being sealingly telescoped on the latter sleeve, the conductor traversing the latter sleeve and being inserted in the blind bore and terminating therein.

6. Cable as in claim 1, wherein the inner conductor is made of multiple strands, there being blind bore sleeves respectively receiving the ends of the strands and being provided as the conductor extensions respectively sealingly traversing the washers.

* * * * *